United States Patent Office 3,038,560
Patented June 12, 1962

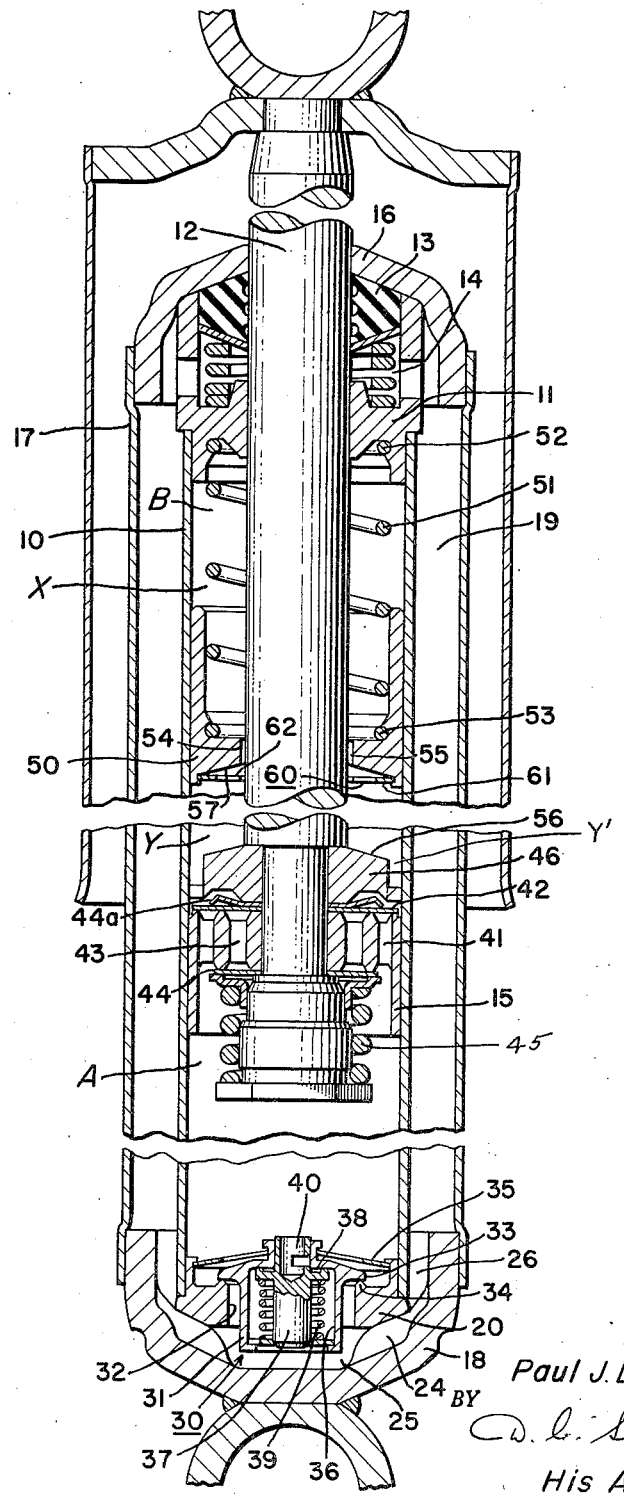

3,038,560
HYDRAULIC SHOCK ABSORBER WITH REBOUND CUT-OFF
Paul J. Long, Jr., Dayton, Ohio, assignor to General Motors Corporation, Detroit, Mich., a corporation of Delaware
Filed Nov. 27, 1959, Ser. No. 855,762
3 Claims. (Cl. 188—88)

This invention relates to hydraulic shock absorbers and particularly to direct-acting type shock absorbers.

In the normal operation of hydraulic shock absorbers a valved piston operates in a cylinder to effect displacement of hydraulic fluid in opposite directions through the piston under control of the resistance valves in the piston. Also, the shock absorber is provided with a base valve in the cylinder which resists flow of hydraulic fluid from the cylinder but allows substantially free flow of fluid on return to the cylinder to and from a reservoir provided around the shock absorber cylinder.

Shock absorbers of this general type have the valving in the piston and in the base valve calibrated to take care of normal road shock conditions.

However, there are times when the vehicle on which the shock absorbers are mounted ride over an abnormal obstruction which causes high velocity of movement of the shock absorber on compression stroke with resultant high velocity movement of the shock absorber on the rebound stroke. The result is the chassis of the vehicle strikes the bump stops provided on the vehicle for this purpose. This gives the passengers of the vehicle a severe jolt that is not desirable.

An object of this invention is to provide a hydraulic shock absorber with means in the rebound chamber of the shock absorber to highly restrict, and practically cut off, flow of fluid from the rebound chamber during at least a portion of the rebound stroke of the shock absorber, and toward the end thereof, to thereby avoid the axle striking the bump stops provided on the vehicle. This is accomplished by providing an auxiliary piston in the rebound chamber of the shock absorber which is adapted to be engaged by the valved piston of the shock absorber when the valved piston approaches the end of the rebound stroke. The valved piston will pick up the auxiliary piston and thereby substantially trap a quantity of liquid in the upper end of the rebound chamber of the shock absorber so that only a very highly restricted flow of hydraulic fluid can thereafter pass from the rebound chamber through the valved piston of the shock absorber. The effect of this operation is to restrict the extension of the shock absorber on rebound stroke to prevent the striking of the bump stops provided on the vehicle.

Another object of the invention is to provide a hydraulic shock absorber having the features of the foregoing object wherein a resiliently acting member is provided between the auxiliary piston and the valved piston of the shock absorber so that when the valved piston is in abutting relationship relative to the auxiliary piston, there will be a fluid flow passage retained between the valved piston and the auxiliary piston to allow for flow of hydraulic fluid from the portion of the rebound chamber between the auxiliary piston and the end wall of the rebound chamber so long as the resistance of the resilient member is not overcome. This will allow normal substantial freedom of movement of the valved piston of the shock absorber on rebound stroke under normal low velocity movement of the piston in the shock absorber.

However, when the velocity of movement of the valved piston of the shock absorber when in its abutting relationship relative to the auxiliary piston of the shock absorber exceeds a predetermined value, fluid flow passages provided in the auxiliary piston will resist flow of fluid from the entrapment chamber between the auxiliary piston and the end of the rebound chamber of the shock absorber with the result there is a pressure differential created on opposite sides of the auxiliary piston which permits the valved piston of the shock absorber to move against the resistance of the resilient member on the auxiliary piston and thereby substantially close the fluid flow passage means of the auxiliary piston. This substantial closure of the passages of the auxiliary piston results in substantial hydraulic entrapment of fluid within the upper end of the rebound chamber of the shock absorber between the auxiliary cylinder and the end wall of the rebound chamber to act as a hydraulic stop against further movement of the valved piston of the shock absorber toward the end wall of the rebound chamber.

Further objects and advantages of the present invention will be apparent from the following description, reference being had to the accompanying drawing wherein preferred embodiments of the present invention are clearly shown.

Referring to the drawing, the shock absorber consists of a cylinder tube 10 in which a piston 15 reciprocates. The cylinder 10 is closed at one end by a rod guide member 11 through which the actuating rod 12 extends, the rod 12 being connected with the piston 15 to reciprocate the same in the cylinder 10. The rod 12 extends through the rod seal 13 that is retained in place in the seal chamber 14 by means of a closure cap 16.

The closure cap 16 carries a reservoir tube 17 spaced from the cylinder tube 10 and concentric therewith. The tube 17 is closed at its opposite end by a closure cap 18, the space between the tubes 10 and 17 forming a liquid reservoir 19.

The lower end of the shock absorber cylinder 10 is closed by a wall member 20 that extends transversely of the cylinder tube 10. This wall 20 is supported on inwardly extending abutments 24 provided on the closure cap 18 to space the wall 20 from the closure cap and provide a fluid flow chamber 25 beneath the wall portion 20 and a flow passage 26 between the chamber 25 and the reservoir chamber 19.

The wall 20 supports a base valve structure 30 adapted to resist flow of hydraulic fluid from the cylinder tube 10 into the reservoir chamber 19 and to allow substantially free flow of fluid from the reservoir chamber into the cylinder tube.

The valve structure 30 consists of a valve element 31 positioned within a bore 32 in the wall 20, the valve element 31 having a radially extending annular flange portion 33 that engages the valve seat 34 whereby to close the bore 32. A light finger spring 35 holds the valve element 31 on the seat 32 but provides little resistance against lifting of the valve from the seat whereby to provide for flow of hydraulic fluid from the reservoir chamber 19 into the cylinder tube 10 below the piston 15 during the rebound stroke of the shock absorber.

The valve structure 30 has an axial bore 36 that receives a valve element 37 seated against the valve seat 38 by the compression spring 39, an axial opening 40 providing for flow of hydraulic fluid from the cylinder tube 10 below the piston 15 against the upper side of the valve element 37 to open the same when the pressure in the chamber overcomes the force effect of the spring 38, the fluid flowing into the bore 36 for flow into the fluid reservoir 19. The compression spring 39 controls the point of opening of the valve 37.

The shock absorber piston 15 that is carried on the end of the actuating rod 12 divides the shock absorber cylinder into a compression chamber A and a rebound chamber B, the upper end of the rod 12 extending through the rebound chamber B and exteriorly of the shock absorber normally for attachment to the chassis of the vehicle. The lower end of the shock absorber is normally connected with the axle of the vehicle.

The piston 15 has a series of fluid flow passages 41 providing for flow of hydraulic fluid from the compression chamber A to the rebound chamber B under control of the valve 42. The piston 15 has a second series of fluid flow passages 43 providing for flow of hydraulic fluid from the rebound chamber B to the compression chamber A under control of the valve 44. A compression spring 45 controls the opening point of the valve 44 while a finger spring 44a controls the opening point of the valve 42.

An abutment plate 46 is positioned above the valve 42 to limit maximum opening of this valve. This abutment plate also cooperates with an auxiliary piston hereinafter described to control or regulate the rebound stroke of the shock absorber in the manner hereinafter described.

The shock absorber thus far described will function in a substantially normal manner wherein movement of the piston 15 toward the base valve 30 will place fluid under compression in the compression chamber A on the compression stroke of the shock absorber. Excess fluid that is not displaced into the rebound chamber B through the valve 42 to fill that chamber as the piston 15 moves toward the base valve 30 will be discharged under pressure through the base valve 30 under control of the valve element 37. The volume of fluid flow through the base valve 30 is equivalent to the displacement volume of the actuating rod 12 that enters the rebound chamber B. On the return stroke or rebound stroke, hydraulic fluid will flow from the rebound chamber B into the compression chamber A under control of the valve 44 to regulate the velocity of movement of the piston 15 away from the base valve 30 on the rebound stroke. Make-up fluid to fill the chamber A on movement of the piston 15 away from the base valve will be received from the reservoir 19 through the bore 32 in the wall 20, the valve element 31 opening against the light finger spring 35 for this purpose.

The shock absorber thus far described has no additional provision, other than control of flow of fluid through the passages 43, for restricting movement of the piston 15 away from the base valve 30 during the rebound stroke of the shock absorber. Thus, when a severe rebound stroke situation is encountered, the velocity of movement of the chassis and axle of the vehicle is such that the resistance to fluid flow provided by the valve 44 is insufficient to prevent the shock absorber from absorbing the full excessive shock condition before the vehicle strikes the bump stops on the vehicle provided for such an emergency. However, when the vehicle strikes the bump stops the passengers of the vehicle are given a severe jolt because of the sudden stopping of motion of the body of the vehicle.

To eliminate this condition on rebound stroke of the shock absorber an additional means is provided for increasing the resistance to movement of the rod 12 and piston 15 away from the base valve 30 and into the rebound chamber B during the rebound stroke. However, the additional resistance to movement of the piston 15 on rebound stroke is desirable only when the velocity of movement of the piston is such that the normal resistance provided by the valve 44 is insufficient to effectively absorb the shock condition before the shock absorber moves to its extended position with the chassis of the vehicle striking the bump stops. In other words, it is desirable so long as the velocity of movement of the piston 15 of the shock absorber is within predetermined and precalculated values at which the valving in the shock absorber will take care of the normal dissipation of movement of the body of the vehicle relative to the axle there is no need for auxiliary resistance to movement of the piston 15 on the rebound stroke. However, when the velocity of movement of the piston 15 exceeds the predetermined values, then it is desirable that some additional resistance to movement of the piston 15 be incorporated in the shock absorber to obtain a hydraulically controlled stopping of the piston 15 on its rebound stroke before the bump stops of the vehicle are engaged by the axle of the vehicle.

In this invention therefore an auxiliary piston 50 is positioned in the cylinder tube 10 within the rebound chamber B and is slidable on the interior wall of the cylinder 10. As will be seen from the drawing the auxiliary piston 50 also surrounds the actuating rod 12 with respect to which the rod can move independent of the auxiliary piston 50. The auxiliary piston 50 is positioned in spaced relationship to the closure wall 11 by means of a resilient spring member 51 that has its upper coil end 52 secured to the closure wall 11 and its lower coil end 53 secured to the auxiliary piston 50. When the shock absorber is inactive, the spring 51 is neither under compression nor tension, but rather is in a relaxed condition when spacing the piston 50 relative to the wall 11.

The auxiliary piston 50 has an axial opening 54 in spaced relationship relative to the outside diameter of the actuating rod 12 thereby providing passage means between the section X of the rebound chamber between the auxiliary piston 50 and the wall 11, and the section Y between the auxiliary piston 50 and the valved piston 15 of the shock absorber.

The space 55 between the axial bore 54 and the outside diameter of the actuating rod 12 provides for flow of hydraulic fluid between the sections X and Y of the rebound chamber on reciprocation of the auxiliary piston 50 in the cylinder 10 under conditions hereinafter described.

The abutment member 46 that is associated with the piston 15 has the seat surface 56 of annular form that is engageable with a corresponding seat surface 57 on the piston 50 through means of an intermediate annular resilient spring 60. The spring 60 being in the form of an annulus has its outer periphery suitably secured to the piston 50 to be carried thereby.

Under normal inactive conditions the annular spring 60 is disposed substantially in the position illustrated in the drawing and in spaced relation to the seat surface 57 on the piston 50.

With the resilient annular spring 60 in the position shown in the drawing hydraulic fluid can flow freely from the space X, thence through the passage 55 into the space Y. Valves 42 and 44 on the piston 15 provide for controlled flow of hydraulic fluid through the piston in either direction of movement from the section Y of the rebound chamber B into the compression chamber A.

When the piston 15 moves upwardly, that is away from the base valve 30, on a rebound stroke, the abutment 46 will engage the annular spring 60 when the piston moves into the upper portion of the rebound stroke. During the latter portion of the rebound stroke the auxiliary piston 50 is moved upwardly with the piston 15 with the result that hydraulic fluid must normally flow from the section X of the rebound chamber B into the section Y of the rebound chamber.

The passage 55 between the bore 54 and the outer surface of the rod 12 provides a pre-established and controlled degree of resistance to flow of hydraulic fluid from the section X into the section Y of the rebound chamber. The annular spring 60 carried by the auxiliary piston 50 has a precontrolled or pre-established spring rate that effects a predetermined resistance to bending of the spring member 60 toward the seat surface 57 on the piston 50. The spring 60 has a solid peripheral portion 61 that secures the spring to the piston 50 and has a plurality of radially inwardly extending fingers 62 that are engaged by the seat surface 56 of the abutment member 46 when the piston 15 moves upwardly toward the piston 50.

So long as the velocity of movement of the piston 15 toward the rod seal end of the shock absorber is below a predetermined rate, thereby moving the piston 50 toward the rod seal end of the shock absorber at the same rate after engagement of the abutment 46 with the spring 60, the volume of fluid flow through the resistance passage 55 is not at a sufficiently high rate as to create any substantial pressure differential between the section X and the section Y of the compression chamber. Under this condition the spring fingers 62 will not be flexed to any substantial degree so that the seat surface 56 is retained in substantial spaced relationship relative to the surface 57 of the piston 50 with the result that hydraulic fluid can flow freely from the section X to the section Y of the compression chamber for passage through the control valve 44 of the piston 15. The effect is much the same as though the auxiliary piston 50 was not present in the compression chamber B.

Thus, under velocity of movement of the piston 15 on a rebound stroke that is below a predetermined rate, the auxiliary piston 50 does not materially change the normal operation of the shock absorber on the rebound stroke. Thus at velocity rates of movement of the piston 15 on the rebound stroke below the predetermined velocity heretofore mentioned, the valves of the piston 15 will function normally to be the control over the flow of hydraulic fluid from the rebound chamber into the compression chamber on the rebound stroke.

However, when the velocity of movement of the piston 15 toward the rod seal end of the shock absorber is above a predetermined and pre-established velocity of movement, the spring fingers 62 of the spring 60 will flex upwardly against the surface 57 of the piston 50 to allow the surface 56 of the abutment 46 to substantially close against the surface 57 with the spring 60 disposed between the surfaces 56 and 57. This positioning of the surfaces 56 and 57 highly restricts and substantially prevents flow of hydraulic fluid from the section X of the rebound chamber into the section Y for passage through the piston 15. In fact the section Y of the rebound chamber has at this time substantially ceased to exist except for the small annular space Y' that is around the abutment member 46 and the space between the abutment member and the piston 15 together with the passages 43.

Thus, when the velocity of movement of the piston 15 on the rebound stroke increases above a predetermined rate of movement, the resistance to flow of hydraulic fluid from the section X of the rebound chamber by substantial closure of the discharge side of the passage 55 will produce a substantial pressure differential between the section X and the section Y of the rebound chamber to result in the aforementioned bending or flexing of the spring 60 to substantially close the outlet end of the passage 55. This provides a substantial hydraulic lock of the hydraulic fluid in the chamber X of the rebound chamber which resists movement of the piston 50 upwardly toward the rod seal end of the shock absorber. Thus only when the velocity of movement of the piston 15 on the rebound stroke is above a pre-established velocity of movement will the resistance to movement of the piston 15 in the latter portion of the rebound stroke be additionally resisted by movement of the piston 50 toward the rod seal end of the shock absorber. However, at this time the additional resistance is such as to substantially prevent engagement of the bump stops on the vehicle during the rebound stroke.

While the embodiments of the present invention as herein disclosed constitute a preferred form, it is to be understood that other forms might be adopted.

What is claimed is as follows:

1. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and over said rod and dividing said rebound chamber into a first section between said auxiliary piston means and an end wall means closing the rebound chamber of said cylinder means and a second section between said first-mentioned piston means and said auxiliary piston means, said auxiliary piston means including passage means for flow of fluid in opposite directions between said first and second sections on opposite reciprocal movement thereof in said cylinder, said first piston including seat means thereon engageable with said auxiliary piston for movement of the first piston with said auxiliary piston on movement of the first piston toward said first section of said rebound chamber and also to provide for substantial closure of said passage means against flow of fluid from said first section and thereby resist rebound movement of said first piston, and resilient means carried on said auxiliary piston engageable by said seat means when said pistons are in their abutting relationship, said resilient spring means preventing said substantial closure of said passage means so long as the velocity of movement of said pistons in their said abutting relationship does not exceed a predetermined value.

2. Hydraulic shock absorber means constructed and arranged in accordance with claim 1 that includes resilient spring means between said auxiliary piston and the end wall of said rebound chamber normally to position said auxiliary piston means in predetermined spaced relationship relative to the said wall and intermediate the full extent of the rebound stroke of the said first piston means.

3. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and over said rod and dividing said rebound chamber into a first section between said auxiliary piston means and an end wall means closing the rebound chamber of said cylinder means and a second section between said first-mentioned piston means and said auxiliary piston means, said auxiliary piston means including passage means for substantially free flow of fluid in opposite directions between said first and second sections on opposite reciprocal movement thereof in said cylinder, said first piston including abutment means engageable with said auxiliary piston for movement therewith on movement of the first piston toward said first section of said rebound chamber and to substantially close thereby said passage means against flow of fluid from said first section and resist thereby rebound movement of said first piston, and means between said pistons when in their abutting relationship preventing said substantial closure of said passage means so long as the velocity of movement of the said pistons in the said relationship does not exceed a predetermined value, said passage means of said auxiliary piston means provided for flow of fluid between said first and second sections of said rebound chamber comprising a clearance space between said auxiliary piston means and said rod and said means between the said pistons comprising resilient spring means carried on said auxiliary piston and engageable by said first-mentioned piston on movement of the first piston into abutting relationship with said auxiliary piston to prevent full closure abutment between the said pistons and thereby substantial closure of said passage means so long as velocity of movement of the said pistons in their abutting relationship does not exceed a predetermined value.

References Cited in the file of this patent

UNITED STATES PATENTS

| | | |
|---|---|---|
| 2,161,811 | Grebe | June 13, 1939 |
| 2,599,477 | Patriguin | June 3, 1952 |
| 2,606,630 | Rossman | Aug. 12, 1952 |
| 2,653,682 | Whisler et al. | Sept. 29, 1953 |
| 2,729,308 | Koski et al. | Jan. 3, 1956 |